(12) United States Patent
Okuma (10) Patent No.: US 6,940,188 B2
(45) Date of Patent: Sep. 6, 2005

(54) ELECTRIC POWER CONVERTING DEVICE

(75) Inventor: Yasuhiro Okuma, Tokyo (JP)

(73) Assignee: Fuji Electric FA Components & Systems Co., Ltd. (JP)

( * ) Notice: Subject to any disclaimer, the term of this patent is extended or adjusted under 35 U.S.C. 154(b) by 0 days.

(21) Appl. No.: 10/777,786

(22) Filed: Feb. 12, 2004

(65) Prior Publication Data

US 2005/0002212 A1 Jan. 6, 2005

(30) Foreign Application Priority Data

Feb. 18, 2003 (JP) ........................................ 2003-039058
Jun. 19, 2003 (JP) ........................................ 2003-174882

(51) Int. Cl.[7] ................................................. H02J 7/00
(52) U.S. Cl. ...................................................... 307/66
(58) Field of Search ............................ 307/66, 98, 99, 307/109; 323/233

(56) References Cited

U.S. PATENT DOCUMENTS

| | | | |
|---|---|---|---|
| 3,293,498 A | * 12/1966 | Baude ........................ | 361/111 |
| 4,516,665 A | 5/1985 | Watanabe | |
| 4,656,571 A | 4/1987 | Umezu | |
| 5,126,585 A | 6/1992 | Boys | |
| 5,915,070 A | * 6/1999 | Takekawa et al. .......... | 388/811 |
| 6,271,633 B1 | 8/2001 | Shen et al. | |
| 6,483,730 B2 | * 11/2002 | Johnson, Jr. ................. | 307/66 |
| 2001/0026460 A1 | 10/2001 | Ito et al. | |

FOREIGN PATENT DOCUMENTS

| | | |
|---|---|---|
| GB | 1 516 693 | 7/1978 |
| JP | 7-337036 A | 12/1995 |
| JP | 10-42559 A | 2/1998 |
| JP | 2000-262070 A | 9/2000 |
| JP | 2002-199620 A | 7/2002 |
| WO | WO 03/103126 A1 | 12/2003 |

OTHER PUBLICATIONS

Hidetaka Kidoguchi: "Applied trend and example of mini–UPS." OHM additional volume (Power Electronics Guidebook) p. 82–87, Nov. 1999.

Pinheiro, H. et al, Space Vector Modulation Method for Single Phase On–Line Three–Leg UPS, INTELEC 2000, IEEE 2000, vol. conf. 22, pp. 679–686, ISBN 0–7803–6408–2.

Gui–Jia Su et al., "A Novel Topology for Single Phase UPS Systems," Industry Applications Conference, 1997, pp. 1376–1382, ISBN 0–7803–4067.

Hirachi Katsuya et al., "Development of UPS Using New Type of Circuits," INTELEC 1994, IEEE 1994, vol conf. 16, pp. 635–642, ISBN 0–7803–2034.

* cited by examiner

Primary Examiner—Shawn Riley
(74) Attorney, Agent, or Firm—Rossi, Kimms & McDowell, LLP (57) ABSTRACT

An electric power converting device can supply a constant voltage to a load while suppressing voltage variation in the AC power source, to reduce breakdown voltages of semiconductor switching elements. The device includes first to third switching element series circuits and at least a first capacitor connected in parallel. One end of the AC power source and one end of the load are connected to each other. Second and third capacitors are connected in parallel to the AC power source side and the load side, respectively. The one end of the power source is connected to a series connection point of the first switching element series circuit through a reactor, the other end of the power source is connected to a series connection point of the second switching element series circuit, and the other end of the load is connected to a series connection point of the third switching element series circuit through another reactor. Change in the power source voltage is compensated by a series converter, which is formed by the second and third switching element series circuits, and change in voltage of the capacitor due to the compensating operation is compensated by charging and discharging operation by a parallel converter formed by the first and second switching element series circuits.

14 Claims, 7 Drawing Sheets

ELECTRIC POWER CONVERTING DEVICE

BACKGROUND

Figure 10:
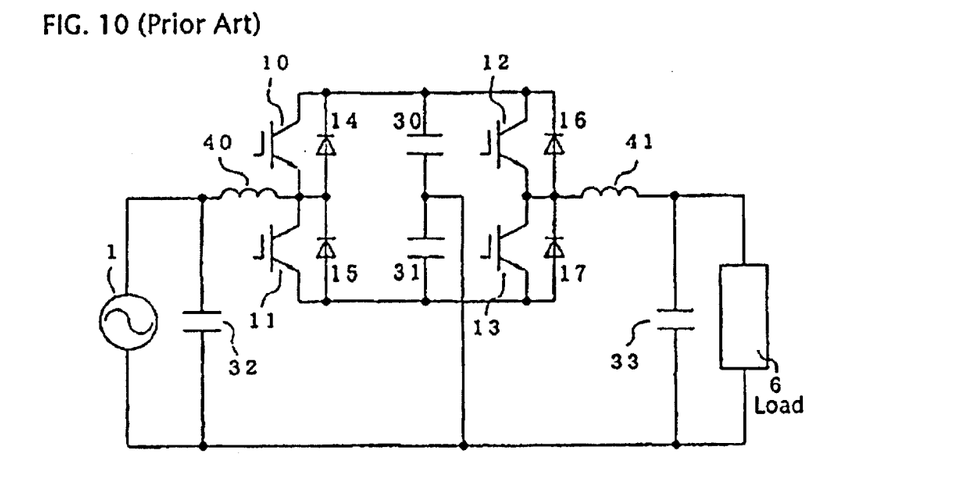
FIG. 10 schematically illustrates a circuit diagram of a conventional power converting device.

FIG. 10 illustrates a circuit of a conventional electric power converting device for once converting alternating-current (AC) electric power to direct-current (DC) electric power and further converting it to AC electric power. In FIG. 10, to one end of an AC power source 1, a series circuit of semiconductor switching elements 10, 11 is connected through a reactor 40. To the semiconductor switching elements 10, 11, diodes 14, 15 are connected in inverse parallel, respectively. The semiconductor switching elements 10, 11 undergoes PWM (Pulse Width Modulation) so that they operate as a rectifier circuit together with the diodes 14, 15 to control the converting operation while storing energy in capacitors 30, 31 connected in series so that the voltage of the capacitors 30, 31 becomes a specified DC voltage.

Moreover, to the series circuit of the capacitors 30, 31, a series circuit of semiconductor switching elements 12, 13 are connected in parallel. To the semiconductor switching elements 12, 13, diodes 16, 17 are connected in inverse parallel, respectively. Here, by operating the semiconductor switching elements 12, 13 as an inverter by the PWM control, a stabilized arbitrary AC voltage is generated from a smoothed DC voltage. The AC voltage is supplied to a load 6. A capacitor 32, namely a filter capacitor, is connected across the AC power source 1. A reactor 41 and another capacitor 33 are connected to the input side of the load 6 to form an LC filter. A circuit similar to FIG. 10 is described in *Power Electronics Guidebook*," Supplementary Volume of *OHM* Magazine, November 1999 issue, p85, OHM-sha.

Figure 11A:
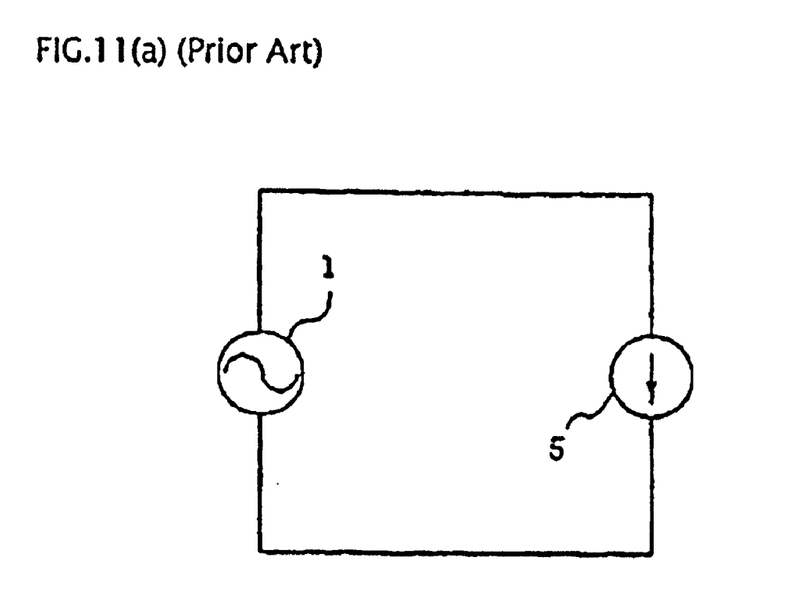
FIG. 11 schematically illustrates a diagram that explains the operating principle of the embodiment of FIG. 10.
Figure 11B:
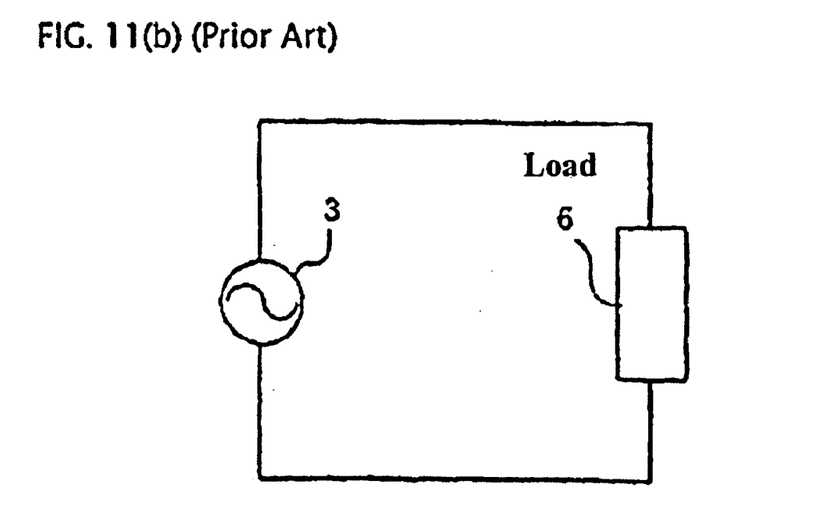

FIG. 10 illustrates a so-called double converter arrangement, which once converts an AC power source voltage to a DC voltage before converting it to back an AC voltage. FIGS. 11A and 11B schematically illustrate the operating principle of the circuit of FIG. 10. In the circuit of FIG. 10, a converter, made up of the semiconductor switching elements 10, 11 and the diodes 14, 15 on the AC power source side, operates as a rectifier circuit. Therefore, the rectifier circuit, as shown in FIGS. 11A and 11B, can be regarded as a parallel current source 5 through which total energy required for the load 6 passes. Moreover, a converter, made up of the semiconductor switching elements 12, 13 and the diodes 16, 17 on the load side of FIG. 10, operates as a so-called inverter to supply a specified voltage to the load 6. Therefore, the converter, as shown in FIGS. 11A and 11B, can be regarded as a parallel voltage source 3 through which the whole energy required for the load 6 passes. Here, the capacitors 30, 31 of FIG. 10 are connected to the output side of the rectifier circuit (i.e., the input side of the inverter), and function as a power source of the inverter. In an electric power converting device of a double converter system as shown in FIG. 10, all of the energy supplied to the load 6 passes through both the converters on the AC power source side and on the load side. In this configuration, the loss generated by each of the converters becomes large. Thus, the problem of reducing conversion efficiency increases the running cost.

Furthermore, both the rectifier circuit and the inverter operate as half bridges to cause a voltage of about twice the AC power source voltage to be applied to the switching elements. Thus, the applied elements require a high breakdown voltage. This further increases the cost.

Accordingly, there remains a need for an electric power converting device that 1) runs more efficiently to cut down the running cost, 2) supply a constant voltage to a load while suppressing voltage variation in an AC power source, 3) reduces the breakdown voltage of circuit elements, such as semiconductor switching elements, to further reduce the cost, 4) operates the first and second switching element series circuits when there is a failure of the AC power source to thereby make it possible to continuously supply energy to a load, and 5) can comply with a plurality kinds of AC power source voltages without changing circuit arrangement or components. The present invention addresses these needs.

SUMMARY OF THE INVENTION

The present invention relates to an electric power converting device that can supply a stabilized voltage from an AC power source to a load.

The electric power converting device can include first, second, and third switching element series circuits, first, second, and third capacitors, and first and second reactors. The first switching element series circuit includes first and second semiconductor switching elements connected in series, each with a diode in inverse-parallel connection. The second switching element series circuit includes third and fourth semiconductor switching elements connected in series, each with a diode in inverse-parallel connection. The third switching element series circuit comprising fifth and sixth semiconductor switching elements connected in series, each with a diode in inverse-parallel connection.

The second capacitor is connected in parallel to an AC power source and the third capacitor is connected in parallel to a load. The first, second, and third switching element series circuits and the first capacitor are connected in parallel to one another. One end of the AC power source and one end of the load are connected to each other.

A series connection point of the first and second semiconductor switching elements of the first switching element series circuit is connected to the one end of the AC power source through the first reactor. A series connection point of the third and fourth semiconductor switching elements of the second switching element series circuit is connected to the other end of the AC power source. A series connection point of the fifth and sixth semiconductor switching elements of the third switching element series circuit is connected to the other end of the load through the second reactor.

The second and third switching element series circuit can form a series converter, which can compensate a change in voltage of the AC power source to supply a constant voltage to the load. The first and second switching element series circuits can form a parallel converter, which can compensates a change in voltage of the first capacitor due to the compensating operation of the series converter by a charging and discharging operation between the AC power source and the first capacitor.

The device can further include a changeover switch having a common terminal and first and second switching contacts, and a main switch. The common terminal can be connected to the other end of the load, and the second switching contact can be connected to the second rector while the first switching contact can be connected to the series connection point of the third and fourth semiconductor switching elements of the second switching element series circuit. The main switch can be connected between the series connection point of the third and fourth semiconductor switching elements of the second switching element series circuit and the other end of the AC power source.

When any of the switching element series circuits is under an abnormal condition, a voltage from the AC power source can be supplied to the load through the main switch, and the first switching contact and the common terminal of the changeover switch. When the AC power source is under an abnormal condition, the main switch also can be turned-off so that the voltage is supplied to the load through the second switching contact and the common terminal of the changeover switch, with the first capacitor taken as a power source.

The device can further include a charging and discharging unit connected across the switching element series circuits, and an energy storing element connected to the charging and discharging unit. When the power source voltage is under a normal condition, the energy storing element stores energy through the charging and discharging unit, and when the power source voltage is under an abnormal condition, the energy storing element supplies the stored energy to the first capacitor through the charging and discharging unit.

Alternatively, the charging and discharging unit can be replaced with a charging unit connected across the AC power source and a separate discharging unit connected across the switching element series circuits. In such an embodiment, the energy storing element is connected to the charging unit and discharging unit. Again, when the power source voltage is under a normal condition, the energy storing element stores energy through the charging unit, and when the power source voltage is under an abnormal condition, the energy storing element supplies the stored energy to the first capacitor through the discharging unit.

The second reactor can be a tapped reactor having one end of thereof connected to the other end of the load and the series connection point of the fifth and sixth semiconductor switching elements of the third switching element series circuit, the other end of thereof connected to the series connection point of the third and fourth semiconductor switching elements of the second switching element series circuit, and a tap terminal thereof connected to the other end of the AC power source.

The device can further include a fourth capacitor connected in series with the first capacitor, the first and fourth capacitors forming a capacitor series circuit, a changeover switch having a common terminal and first and second switching contacts, and a voltage distinguishing circuit connected between the changeover switch and the AC power source. The voltage distinguishing circuit distinguishes whether an AC power source voltage is higher or lower than a specified voltage. The common terminal of the changeover switch is connected to the other end of the AC power source. The first switching contact of the changeover switch is connected to the series connection point of the third and fourth semiconductor switching elements of the second switching element series circuit. The second switching contact of the changeover switch is connected to a series connection point of the first and fourth capacitors of the capacitor series circuit.

The changeover switch is switchable to connect the common terminal to the first switching contact when the voltage distinguishing circuit distinguishes that the AC power source voltage is higher than the specified voltage, and the changeover switch is switchable to connect the common terminal to the second switching contact when the voltage distinguishing circuit distinguishes that the AC power source voltage is lower than the specified voltage.

When the changeover switch is switched to connect the common terminal to the first switching contact, the second and third switching element series circuits form the series converter, which compensates a change in voltage of the AC power source to supply a constant voltage to the load, and the first and second switching element series circuits form the parallel converter, which compensates a change in voltage of the first and fourth capacitors due to the compensating operation of the series converter by a charging and discharging operation between the AC power source and the first and fourth capacitors.

When the changeover switch is switched to connect the common terminal to the second switching contact, the third switching element series circuit forms the series converter, which compensates a change in voltage of the AC power source to supply a constant voltage to the load, and the first switching element series circuit forms the parallel converter, which compensates a change in voltage of the first and fourth capacitors due to the compensating operation of the series converter by a charging and discharging operation between the AC power source and the first and fourth capacitors.

The device can further include a switching unit and the afore-described capacitor series circuit and the voltage distinguishing circuit connected between the switching unit and the AC power source. The switching unit is connected between the series connection point of the first and fourth capacitors of the capacitor series circuit and the other end of the AC power source. The switching unit is turned-off when the voltage distinguishing circuit distinguishes that the AC power source voltage is higher than the specified voltage, and the switching unit is turned-on when the voltage distinguishing circuit distinguishes that the AC power source voltage is lower than the specified voltage.

When the switching unit is turned-off, the second and third switching element series circuits form the series converter, which compensates a change in voltage of the AC power source to supply a constant voltage to the load, and the first and second switching element series circuits form the parallel converter, which compensates a change in voltage of the first and fourth capacitors due to the compensating operation of the series converter by a charging and discharging operation between the AC power source and the first and fourth capacitors.

When the switching unit is turned-on, the third switching element series circuit forms the series converter, which compensates a change in voltage of the AC power source to supply a constant voltage to the load, and the first switching element series circuit forms the parallel converter, which compensates a change in voltage of the first and fourth capacitors due to the compensating operation of the series converter by a charging and discharging operation between the AC power source and the first and fourth capacitors.

BRIEF DESCRIPTION OF THE DRAWINGS

The invention will be described with reference to certain preferred embodiments thereof along with the accompanying drawings, wherein:

FIGS. 3(a)1–3(a)3 schematically illustrate the waveforms during the voltage reduction operations of the device of FIG. 1;

FIGS. 3(b)(1)–3(b)(3) schematically illustrate the waveforms during the voltage raising operation of the device of FIG. 1;

DETAILED DESCRIPTION

Figure 1:
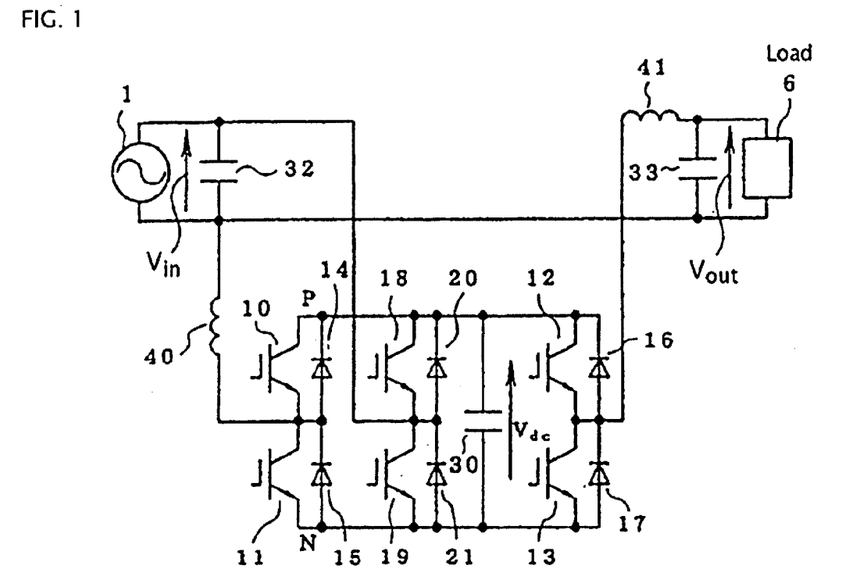
FIG. 1 schematically illustrates a circuit of a first embodiment of an electric power converting device according to the present invention.

Referring to FIG. 1, the device has first, second, and third series circuits of first, second, third, fourth, fifth, and sixth semiconductor switching elements 10, 11, 18, 19, 12, 13, such as IGBTs (Insulated Gate Bipolar Transistors), connected to first, second, third, fourth, fifth, and sixth diodes 14, 15, 20, 21, 16, 17 in inverse-parallel relationship, respectively. The first and second switching elements 10, 11 are connected inversely-parallel with the first and second diodes 14, 15 (referred to as a "first switching element series circuit"), the third and fourth switching elements 18, 19 are inversely-parallel with the third and fourth diodes 20, 21 (referred to as a "second switching element series circuit"), and the fifth and sixth elements 12, 13 are connected inversely-parallel with the fifth and sixth diodes 16, 17 (referred to as a "third switching element series circuit").

The device further includes a first capacitor (e.g., electrolytic capacitor) 30, a second capacitor 32, and a third capacitor 33. The first capacitor 30 is connected in parallel to the first, second, and third switching element series circuits, the second capacitor 32 is connected in parallel to an AC power source 1, and the third capacitor 33 is connected in parallel to the load 6. In addition, one end of the AC power source 1 is connected to one end of the load 6. The other end of the AC power source 1 is connected to a series connection point of the third and fourth semiconductor switching elements 18, 19. Furthermore, the one end of the AC power source 1 is also connected to a series connection point of the first and second semiconductor switching elements 10, 11 through a first reactor 40. The other end of the load 6 is connected to a series connection point of the fifth and sixth semiconductor switching elements 12, 13 through a second reactor 41.

In the above circuit arrangement, when the first capacitor 30 is considered to be a power source of a converter formed with the semiconductor switching elements 18, 19, 12, 13 and the diodes 20, 21, 16, 17, the converter is connected in series between the AC power source 1 and the load 6. Hereinafter, this is referred to as a "series converter." Moreover, the semiconductor switching elements 10, 11, 18, 19 and the diodes 14, 15, 20, 21 are connected in parallel to the AC source 1, to the output side of which the capacitor 30 is connected. Hereafter, this is referred to as a parallel converter.

Figure 2:
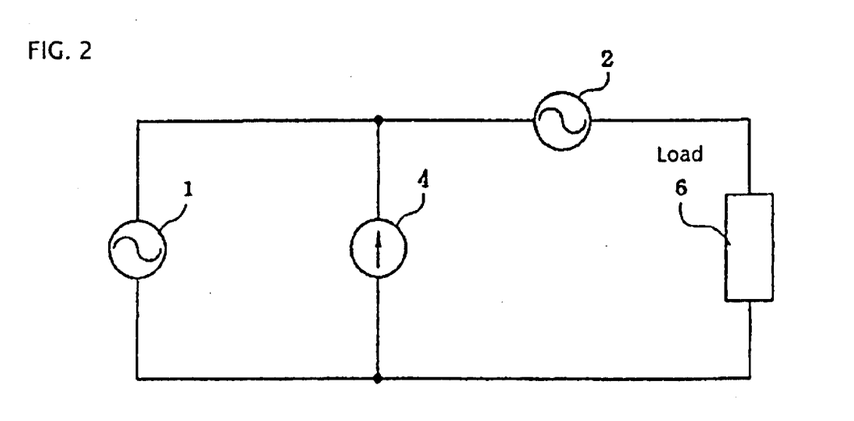
FIG. 2 schematically illustrates a diagram that explains the operating principle of the embodiment of FIG. 1.

Referring to FIG. 2, a parallel compensating current source 4 represents the parallel converter, and a series compensating voltage source 2 represents the series converter. At this time, the series compensating voltage source 2 generates an arbitrary voltage. The added voltages due to two voltage sources of the AC source 1 and the series compensating voltage source 2 are applied to the load 6. As a result, even when the voltage of the AC source 1 is lowered, a variable voltage by the series compensating voltage source 2 is added to the load 6, by which variation in the power source voltage can be compensated to supply a constant voltage to the load 6.

Figure 3A:
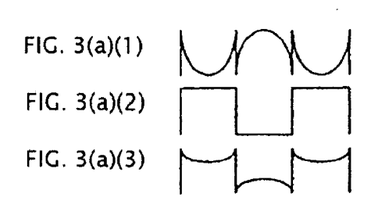
Figure 3B:
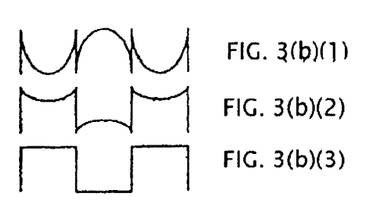

Referring to FIG. 3, additional explanations will be made as to the operations of the series converter and the parallel converter of FIG. 1. FIGS. 3(a)1–3(a)(3), 3(b)(1)–3(b)(3) show the output voltage waveforms of command values in each series arm of the semiconductor switching elements taken at the electric potential point N in the first to third switching element series circuits of FIG. 1. First, referring to FIG. 3(a)(1)–3(a)(3), which illustrates the waveforms during voltage reduction operation, a voltage reduction operation is carried out to supply a constant voltage to the load 6 that is lower than the AC power source 1. In this case, by switching the semiconductor switching elements 18, 19 in synchronism with the power source voltage, the output voltage of the series arm of the semiconductor switching elements becomes a rectangular wave as a command value illustrated in FIG. 3(a)(2). To reduce the supply voltage supplied to the load 6, the semiconductor switching elements 12, 13 forming the series converter are switched so that the output voltage waveform of the series arm of the semiconductor switching elements becomes a waveform of a command value illustrated in FIG. 3(a)(3). As a result, the voltage output between the series connection point of the semiconductor switching elements 18, 19 and the series connection point of the semiconductor switching elements 12, 13, is equivalent to the sinusoidal command value (sinusoidal voltage in opposite phase to the power source voltage with a small amplitude) represented by the difference between the voltage of the command value illustrated in FIG. 3(a)(2) and the voltage of the command value illustrated in FIG. 3(a)(3). The sinusoidal voltage corresponds to the output voltage of the series compensating voltage source 2 (series converter) of FIG. 2. The voltage is superposed on the power source voltage of the AC power source 1 to realize a voltage reduction operation, by which a voltage lower than the power source voltage is applied to the load 6.

At the same time, as shown with the voltage waveform of the command value illustrated in FIG. 3(a)(1), the semiconductor switching elements 10, 11, while generating an opposing voltage equivalent to the input voltage as a parallel converter, induce the capacitor 30 to charge and discharge between the AC power source 1 and the capacitor 30 so that the voltage across the capacitor 30 (Vdc in FIG. 1), fluctuated by the above-described voltage reduction operation, is kept constant. As a result, the parallel converter exchanges energy to be compensated with the series converter.

Referring to FIGS. 3(b)(1)–3(b)(3), when a voltage raising operation is carried out to supply a constant voltage to the load 6 that is higher than the power source voltage by switching the semiconductor switching elements 12, 13 in synchronism with the power source voltage, the output voltage waveform of the series arm of the semiconductor switching elements becomes a rectangular wave shown as a command value illustrated in FIG. 3(b)(3). Furthermore, by carrying out control so that the output voltage waveform of the series arm with the semiconductor switching elements 18, 19 becomes a waveform of a command value illustrated in FIG. 3(*b*)(2), the voltage output between the series connection point of the switching elements 18, 19 and the series connection point of the switching elements 12, 13 is equivalent to a sinusoidal command value (sinusoidal voltage in phase with the power source voltage with a small amplitude) that is represented by the difference between the voltage of the command value illustrated in FIG. 3(*b*)(2) and the voltage of the command value FIG. 3(*b*)(3). The sinusoidal voltage also corresponds to the output voltage of the series compensating voltage source 2 (series converter) of FIG. 2. The voltage is superposed on the power source voltage of the AC power source 1 to therefore realize a voltage raising operation, by which a voltage higher than the power source voltage is applied to the load 6.

At the same time, as shown with the voltage waveform of a command value illustrated in FIG. 3(*b*)(1), the semiconductor switching elements 10, 11, while generating opposing voltage equivalent to the input voltage as a parallel converter, induce the capacitor 30 to charge and discharge between the AC power source 1 and the capacitor 30 so that the voltage across the capacitor 30 (Vdc in FIG. 1), fluctuated by the above-described voltage raising operation, is kept constant. As a result, the parallel converter exchanges energy that is compensated with the series converter.

Therefore, in any of the cases of the voltage raising operation and the voltage reduction operation, the energy supplied to the load 6 passes through only the series converter, and only the energy used for voltage compensation of the capacitor 30 passes through the parallel converter. This can compensate any loss of voltage in the parallel converter in comparison with that of the conventional double converter system to make it possible to enhance efficiency. Moreover, according to the present invention, both the parallel converter and the series converter have a full bridge function. This lowers the breakdown voltages of semiconductor switching elements and the like as compared with a conventional half-bridge arrangement.

Figure 4:
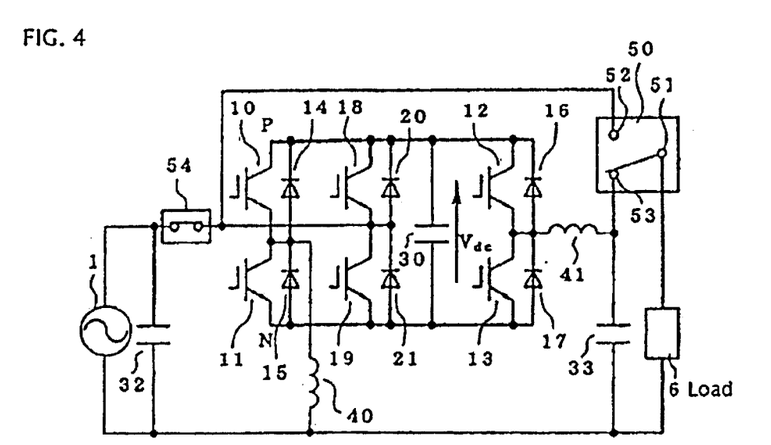
FIG. 4 schematically illustrates a circuit diagram of a second embodiment of an electric power converting device according to the present invention.

Referring to FIG. 4, the difference between the second embodiment and the first embodiment of FIG. 1 is that the second embodiment includes a main switch 54 on the AC power source side and a changeover switch 50 on the load side. Specifically, the main switch 54 is connected between one end of the AC power source 1 and the series connection point of the semiconductor switching elements 18, 19. Moreover, the changeover switch 50 has a common terminal 51 and a first and second switching contacts 52 and 53, in which one end of the load 6 is connected to the common terminal 51 and the first switching contact 52 is connected to the series connection point of the semiconductor switching elements 18, 19 and the second switching contact 53 is connected to a connection point of the reactor 41 and the capacitor 33.

In the embodiment of FIG. 4, under normal operating conditions, the main switch 54 is turned-on (closed) and the common terminal 51 of the changeover switch 50 is connected to the second switching contact side. In this mode, the circuit arrangement is essentially the same as FIG. 1. Thus, like the circuit arrangement of FIG. 1, by the operations of the parallel converter and the series converter, a stabilized AC voltage is supplied to the load 6. When there is a failure in the circuit elements, such as the semiconductor switching elements and diodes, the changeover switch 50 is switched to the first switching contact side with the main switch 54 kept turned-on. This directly supplies AC power to the load 6 from the AC power source 1 through the main switch 54 and the changeover switch 50.

Moreover, when the voltage of the AC power source 1 exceeds the compensation range, the main switch 54 can be turned-off (open) and the changeover switch 50 can be switched to the second switching contact side, by which the DC voltage of the capacitor 30 can be converted to an AC voltage by the semiconductor switching elements 10, 11, 12, 13 and supplied to the load 6. The condition for switching the main switch 54 or the changeover switch 50 can be decided from the result of detection of the voltage Vdc across the capacitor 30 or the power source voltage (see the embodiment of FIGS. 8 and 9). The compensation time in a series-to-parallel converter when the voltage of the AC power source 1 exceeds the compensation range is short, e.g., about five minutes. Therefore, it is enough for the semiconductor switching elements and cooling devices to be so small as to bring about cost reduction.

Figure 5:
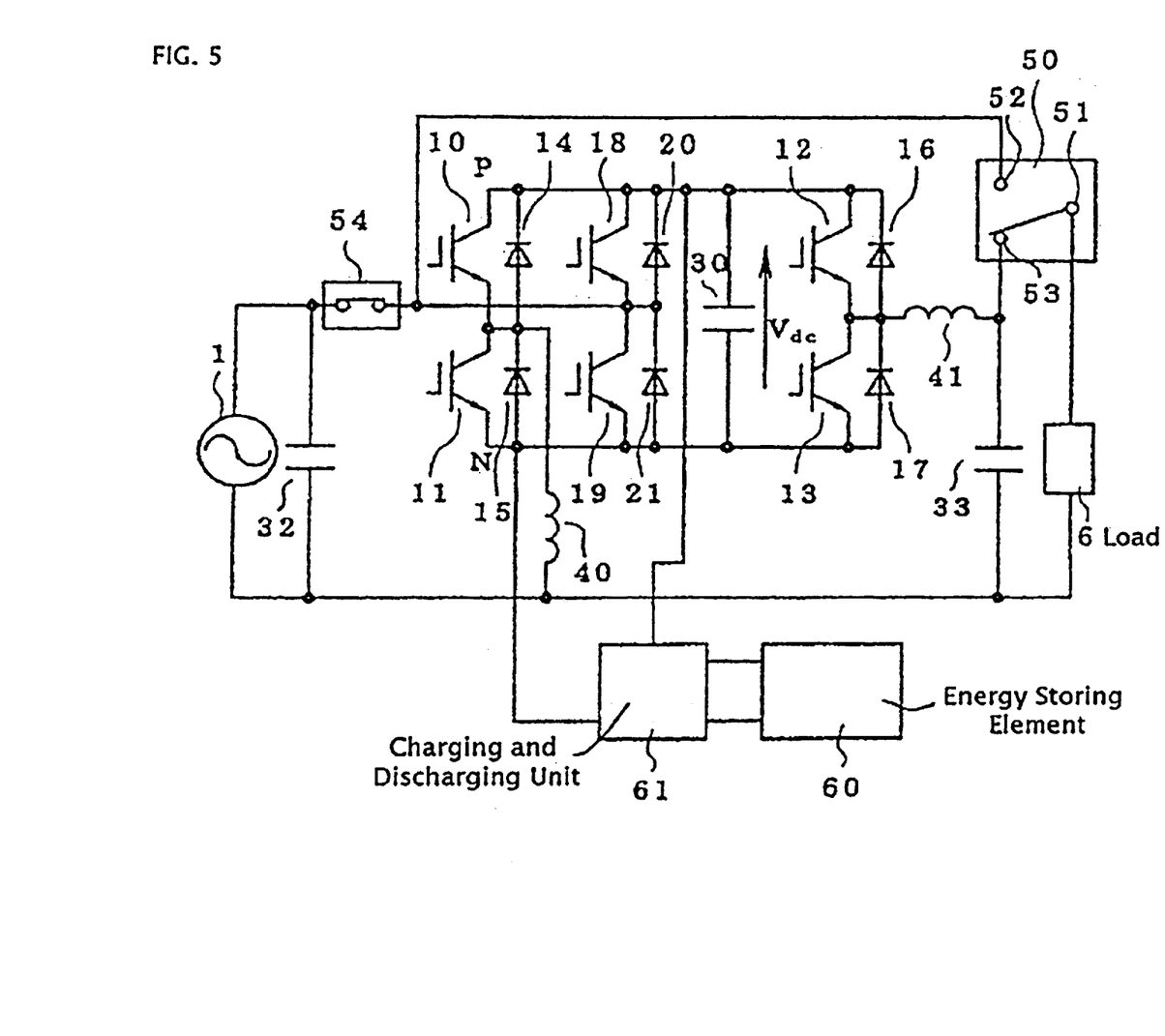
FIG. 5 schematically illustrates a circuit diagram of a third embodiment of an electric power converting device according to the present invention.

Referring to FIG. 5, the third embodiment is identical to the embodiment of FIG. 4, but further includes an energy storing element 60 connected in parallel between points P and N in the first to third switching element series circuits through a charging and discharging unit 61. Note that the charging and discharging unit 61 and the energy storing element 60 also can be added to the first embodiment. Here, the charging and discharging unit 61 is made up of semiconductor switches and magnetic parts, such as reactors. The energy storing element 60 can include a secondary cell, such as a battery, a flywheel and the like.

FIG. 5 illustrates the operating mode under a normal condition of the AC power source 1, where the main switch 54 is on (closed) and the changeover switch 50 is connected to the second switching contact 53. Thus, by the operations of the series converter and the parallel converter as previously explained with respect to FIG. 1, a stabilized AC voltage is supplied to the load 6. Meanwhile, by the charging operation of the charging and discharging unit 61, energy is supplied from the AC power source 1 to be stored in the energy storing element 60. When the AC power source 1 is under an abnormal condition, for example, when the AC power source 1 is unable to supply sufficient power to the load 6 due to power failure, the stored energy in the energy storing element 60 is discharged through the charging and discharging unit 61 to charge the capacitor 30. In this case, since the way of detecting abnormality of the AC power source 1 and the way of controlling the charging and discharging unit 61 are well known, the detailed explanation thereof will be omitted. Moreover, at this time, the main switch 54 is turned-off (open) while the changeover switch 50 is kept in the state shown in FIG. 5.

With the above-described operation, when the AC power source 1 is under an abnormal condition, by the operation of the semiconductor switching elements 10, 11, 12, 13 with the capacitor 30 taken as a power source, the electrical supply to the load 6 can be continued through the changeover switch 50. The embodiment of FIG. 5 operates as described in the embodiment of FIG. 4, when the circuit elements, such as the semiconductor switching elements, fail or when there is an abnormal drop in the power source voltage.

Figure 6:
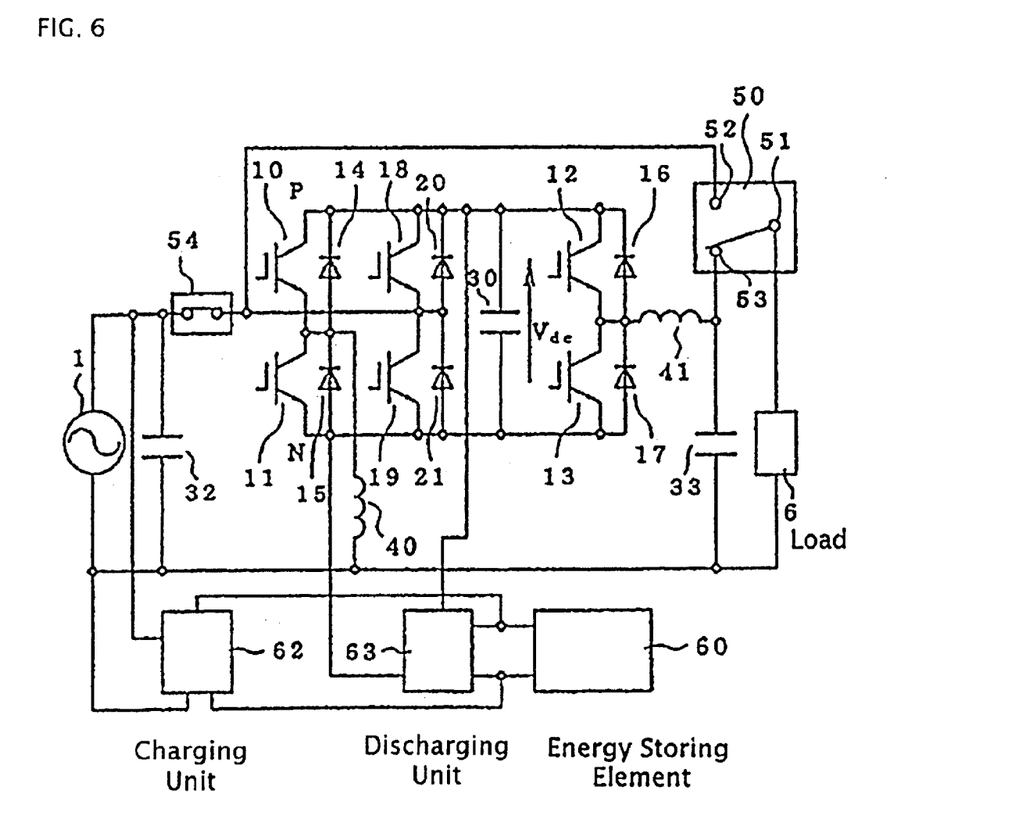
FIG. 6 schematically illustrates a circuit diagram of a fourth embodiment of an electric power converting device according to the present invention.

Referring to FIG. 6, the fourth embodiment is identical to the embodiment of FIG. 5, but further includes separate charging and discharging units 62, 63 in place of the common charging and discharging unit 61. The charging unit 62 is connected across the AC power source 1 while the discharging unit 63 is connected between the points P and N, and the energy storing element 60 is connected in parallel to the charging unit 62 and the discharging unit 63. The charging unit 62, discharging unit 63, and the energy storing element 60 also can be added to the embodiment of FIG. 1.

In operation of the fourth embodiment, the energy is kept charged in the energy storing element 60 by the charging unit 62 under a normal condition of the AC power source 1, while under an abnormal condition of the AC power source 1, for example, at power failure, the energy stored in the energy storing element 60 is supplied to the capacitor 30 via the discharging unit 63. With the capacitor 30 taken as a power source, the series converter and the parallel converter can be operated, to supply a desired voltage continuously to the load 6. The charging unit 62 and the charging unit 63 can be made up of a combination of semiconductor switches and magnetic parts, and for the energy storing element 60, similar one to that in the embodiment of FIG. 5 can be used.

Figure 7:
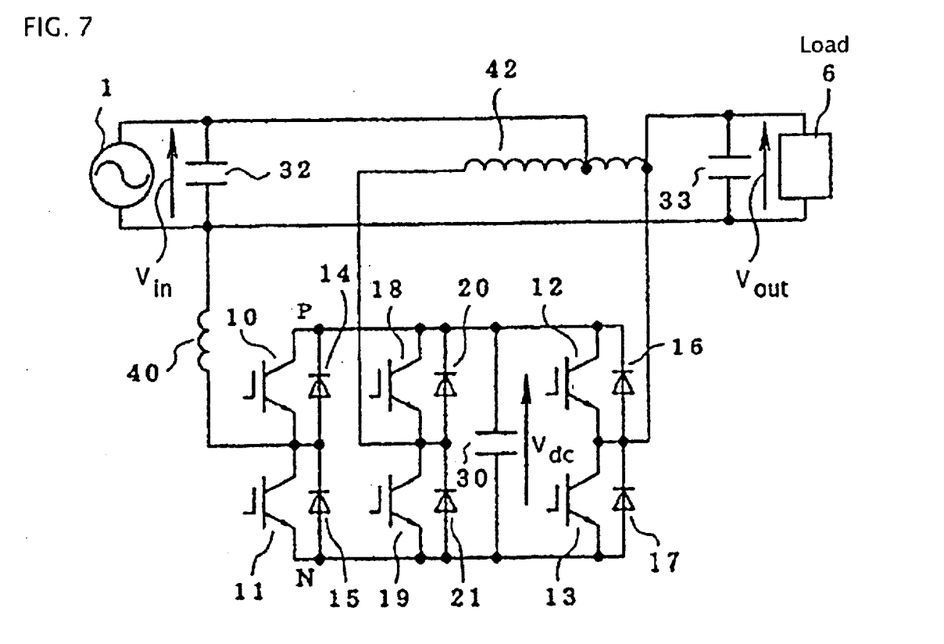
FIG. 7 schematically illustrates a circuit diagram of a fifth embodiment of an electric power converting device according to the present invention.

Referring to FIG. 7, the fifth embodiment is substantially similar to the first embodiment of FIG. 1, but uses a different reactor 42 for the load side. Here, the second reactor 42 is a tapped reactor, with one end connected to the load and to the series connection point of the semiconductor switching elements 12, 13 and the other end thereof connected to the series connection point of the semiconductor switching elements 18, 19. The one end of the AC power source 1 on the side not directly connected to the load 6 is connected to a tap terminal of the tapped reactor 42.

According to the embodiment of FIG. 7, current passing through the series converter formed with the capacitor 30, semiconductor switching elements 18, 19, 12, 13 and the like can be reduced. This reduces the switching loss to permit further efficiency improvement together with loss reduction in the parallel converter. The parallel converter operates the same as previously described.

The tapped reactor 42 of FIG. 7 can be used as a substitution for the second reactor 41 in each embodiment of FIGS. 4–6. For example, this can be performed by removing the reactor 41 in FIGS. 4–6, connecting one end of the tapped reactor 42 to the second switching contact 53 of the changeover switch 50 and the series connection point of the semiconductor switching element 12, 13, while connecting the other end of the tapped reactor 42 to the series connection point of the semiconductor switching elements 18, 19, disconnecting one end of the main switch 54 from the series connection point of the semiconductor switching elements 18, 19 to connect the disconnected one end to the tap terminal of the tapped reactor 42.

Furthermore, to the above-described arrangement, the charging and discharging unit 61 and the energy storing element 60 shown in FIG. 5, or the charging unit 62, the discharging unit 63 and the energy storing element 60 shown in FIG. 6 can be added to the embodiments of FIGS. 1 and 4.

Figure 8:
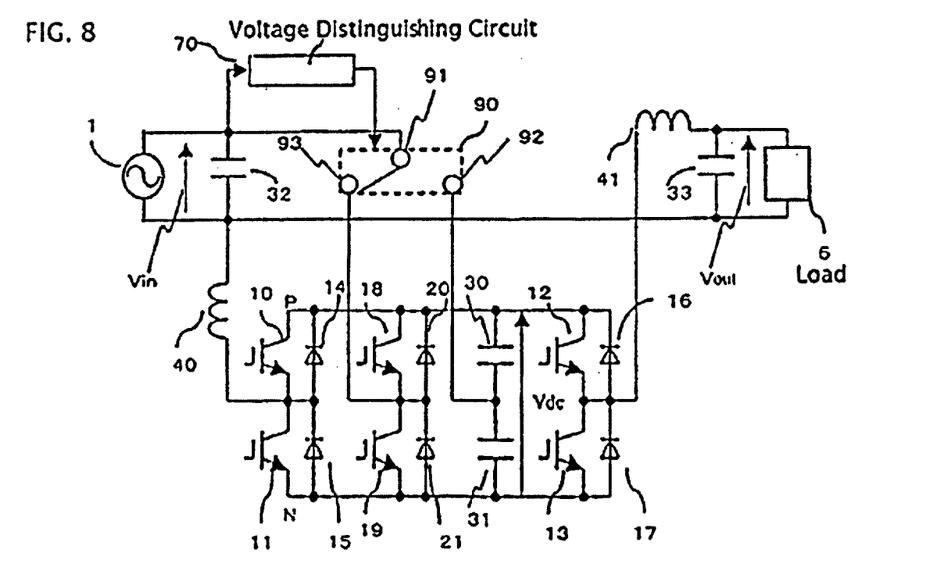
FIG. 8 schematically illustrates a circuit diagram of a sixth embodiment of an electric power converting device according to the present invention.

Referring to FIG. 8, the sixth embodiment is substantially similar to the embodiment of FIG. 1, but it further includes a voltage distinguishing circuit, a changeover switch 90, and another capacitor 31 connected with the capacitor 30. In this embodiment, a series circuit of the first capacitor (electrolytic capacitor) 30 and a fourth capacitor (electrolytic capacitor) 31 (referred to as a "capacitor series circuit") are connected in parallel to one another. The other end of the AC power source 1 that is not directly connected to the load 6 is connected to a common terminal 91 of the changeover switch 90, which has first and second switching contacts 92, 93, the first switching contact 93 is connected to a series connection point of the third and fourth semiconductor switching elements 18, 19, and the second switching contact 92 is connected to a series connection point of the capacitors 30. To the AC power source 1, a voltage distinguishing circuit 70 for distinguishing whether the voltage is higher or lower than a specified value is connected.

In the embodiment of FIG. 8, when the voltage distinguishing circuit 70 distinguishes that the voltage of the AC power source 1 is higher than a specified value, switching the changeover switch 90 to the first switching contact 93 side provides the circuit arrangement that is the same as that of FIG. 1, albeit the capacitor 31, which together with the capacitor 30 nonetheless provides the same capacitor operation. Moreover, when the voltage distinguishing circuit 70 distinguishes that the voltage of the AC power source 1 as lower than a specified value, switching the changeover switch 90 to the second switching contact 92 side and keeping the semiconductor switching elements 18, 19 in the turned-off state allows the circuit arrangement to be regarded as being the same as that of the conventional circuit shown in FIG. 10. Namely, by switching the changeover switch 90, the present circuit system can be operated as a half bridge or a full bridge.

Here, for example, distinguishing in the voltage distinguishing circuit 70 whether the AC power source voltage is 100V or 200V is to provide the selection of the circuit of the half bridge when the voltage is decided to be 100V, while the circuit of the full bridge when 200V. In both cases, the voltages applied to the semiconductor switching elements become to be in equal so that no change in element breakdown voltage by circuit is necessary.

Figure 9:
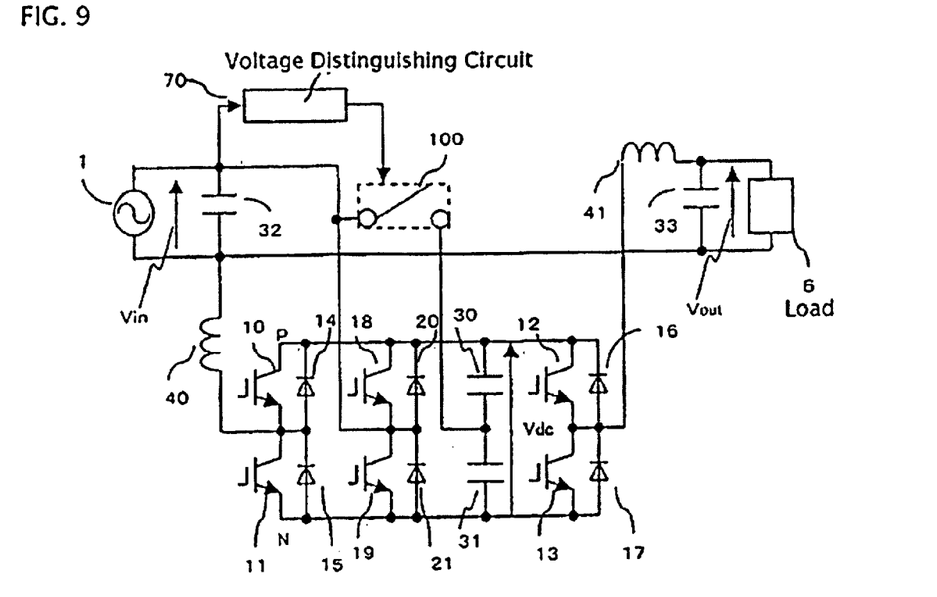
FIG. 9 schematically illustrates a circuit diagram of a seventh embodiment of an electric power converting device according to the present invention.

Referring to FIG. 9, the seventh embodiment is substantially identical to the sixth embodiment of FIG. 8, except for the changeover switch configuration. In the embodiment of FIG. 9, instead of a changeover switch provided with two switching contacts, it uses a switch 100 provided with only one contact.

In FIG. 9, when the voltage distinguishing circuit 70 distinguishes that the voltage of the AC power source 1 is higher than a specified value, turning-off the switch 100 provides the circuit arrangement the same as that of FIG. 1, albeit the capacitor 31, which together with the capacitor 30 nonetheless also provides the same capacitor operation. Moreover, when the voltage distinguishing circuit 70 distinguishes that the voltage of the AC power source 1 is lower than a specified value, turning-on the switch 100 and keeping the semiconductor switching elements 18, 19 in the turned-off state allow the circuit arrangement to be regarded as being the same as that of the conventional circuit shown in FIG. 10. Namely, by turning-on or turning-off the switch 100, switching is to be performed between a half bridge and a full bridge with the circuit system.

Here, for example, distinguishing in the voltage distinguishing circuit 70 whether the AC power source voltage is 100V or 200V is to provide the selection of the circuit of the half bridge when the voltage is decided to be 100V, while the circuit of the full bridge when 200V. In both cases, the voltages applied to the semiconductor switching elements become to be in equal so that no change in element breakdown voltage by circuit is needed.

The present invention can change the conventional double converter to a full bridge and changes a way of connecting to the AC power source and the load. This operates the converter on the load side as a series converter to form a so-called series-parallel converting device such that, when the voltage of the AC power source is changed, the series converter compensates the change in voltage and only the amount of energy necessary for the compensation is compensated by the parallel converter on the AC power source side.

As explained above, according to the invention, by the operations of the series converter and the parallel converter, it is possible to supply a constant voltage to the load while suppressing voltage variation in the AC power source. At this time, the loss in the parallel converter is reduced to make it possible to increase a conversion efficiency higher than before and reduce the running cost.

Moreover, by providing the converter with a full bridge arrangement, it is possible to reduce breakdown voltages of the semiconductor switching elements and the like to reduce the duties of the elements with cost reduction thereof.

In addition, compared with a conventional converter with a half bridge arrangement, it is also possible to suppress a ripple current from the electrolytic capacitor to provide the capacitor with long life.

Furthermore, by adding a changeover switch, it becomes possible to comply with AC inputs of 100V system and 200V system with the same arrangement without changing breakdown voltages of elements. Accordingly, it becomes possible to provide a power source system with high reliability and a high mass-production effect.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosures of the priority applications, JP 2003-039058 and JP 2003-174882, in their entirety, including the drawings, claims, and the specification thereof, are incorporated herein by reference.

What is claimed is:

1. An electric power converting device comprising:
   a first switching element series circuit comprising first and second semiconductor switching elements connected in series, each with a diode in inverse-parallel connection;
   a second switching element series circuit comprising third and fourth semiconductor switching elements connected in series, each with a diode in inverse-parallel connection;
   a third switching element series circuit comprising fifth and sixth semiconductor switching elements connected in series, each with a diode in inverse-parallel connection;
   a first capacitor;
   a second capacitor connected in parallel to an AC power source;
   a third capacitor connected in parallel to a load;
   a first reactor; and
   a second reactor,
   wherein the first, second, and third switching element series circuits and the first capacitor are connected in parallel to one another,
   wherein one end of the AC power source and one end of the load are connected to each other,
   wherein a series connection point of the first and second semiconductor switching elements of the first switching element series circuit is connected to the one end of the AC power source through the first reactor,
   wherein a series connection point of the third and fourth semiconductor switching elements of the second switching element series circuit is connected to the other end of the AC power source,
   wherein a series connection point of the fifth and sixth semiconductor switching elements of the third switching element series circuit is connected to the other end of the load through the second reactor,
   wherein the second and third switching element series circuits form a series converter, which compensates a change in voltage of the AC power source to supply a constant voltage to the load, and
   wherein the first and second switching element series circuits form a parallel converter, which compensates a change in voltage of the first capacitor due to the compensating operation of the series converter by a charging and discharging operation between the AC power source and the first capacitor.

2. The electric power converting device as claimed in claim 1, further including:
   a changeover switch having a common terminal and first and second switching contacts; and
   a main switch,
   wherein the common terminal is connected to the other end of the load,
   wherein the second switching contact is connected to one end of the second reactor,
   wherein the first switching contact is connected to the series connection point of the third and fourth semiconductor switching elements of the second switching element series circuit,
   wherein the main switch is connected between the series connection point of the third and fourth semiconductor switching elements of the second switching element series circuit and the other end of the AC power source,
   wherein when any of the switching element series circuits is under an abnormal condition, a voltage from the AC power source is supplied to the load through the main switch, and the first switching contact and the common terminal of the changeover switch, and
   wherein when the AC power source is under an abnormal condition, the main switch is turned-off and a voltage is supplied to the load through the second switching contact and the common terminal of the changeover switch, with the first capacitor taken as a power source.

3. The electric power converting device as claimed in claim 1, further including:
   a charging and discharging unit connected across the switching element series circuits; and
   an energy storing element connected to the charging and discharging unit,
   wherein when the power source voltage is under a normal condition, the energy storing element stores energy through the charging and discharging unit, and
   wherein when the power source voltage is under an abnormal condition, the energy storing element supplies the stored energy to the first capacitor through the charging and discharging unit.

4. The electric power converting device as claimed in claim 2, further including:
   a charging and discharging unit connected across the switching element series circuits; and
   an energy storing element connected to the charging and discharging unit,
   wherein when the power source voltage is under a normal condition, the energy storing element stores energy through the charging and discharging unit, and
   wherein when the power source voltage is under an abnormal condition, the energy storing element supplies the stored energy to the first capacitor through the charging and discharging unit.

5. The electric power converting device as claimed in claim 1, further including:
a charging unit connected across the AC power source;
a discharging unit connected across the switching element series circuits; and
an energy storing element connected to the charging unit and discharging unit,
wherein when the power source voltage is under a normal condition, the energy storing element stores energy through the charging unit, and
wherein when the power source voltage is under an abnormal condition, the energy storing element supplies the stored energy to the first capacitor through the discharging unit.

6. The electric power converting device as claimed in claim 2, further including:
a charging unit connected across the AC power source;
a discharging unit connected across the switching element series circuits; and
an energy storing element connected to the charging unit and discharging unit,
wherein when the power source voltage is under a normal condition, the energy storing element stores energy through the charging unit, and
wherein when the power source voltage is under an abnormal condition, the energy storing element supplies the stored energy to the first capacitor through the discharging unit.

7. The electric power converting device as claimed in claim 1, wherein the second reactor is a tapped reactor having one end of thereof connected to the other end of the load and the series connection point of the fifth and sixth semiconductor switching elements of the third switching element series circuit, the other end of thereof connected to the series connection point of the third and fourth semiconductor switching elements of the second switching element series circuit, and a tap terminal thereof connected to the other end of the AC power source.

8. The electric power converting device as claimed in claim 2, wherein the second reactor is a tapped reactor having one end thereof connected to the other end of the load and the series connection point of the fifth and sixth semiconductor switching elements of the third switching element series circuit, the other end thereof connected to the series connection point of the third and fourth semiconductor switching elements of the second switching element series circuit, and a tapped terminal thereof connected to the other end of the AC power source.

9. The electric power converting device as claimed in claim 3, wherein the second reactor is a tapped reactor having one end thereof connected to the other end of the load and the series connection point of the fifth and sixth semiconductor switching elements of the third switching element series circuit, the other end thereof connected to the series connection point of the third and fourth semiconductor switching elements of the second switching element series circuit, and a tapped terminal thereof connected to the other end of the AC power source.

10. The electric power converting device as claimed in claim 4, wherein the second reactor is a tapped reactor having one end thereof connected to the other end of the load and the series connection point of the fifth and sixth semiconductor switching elements of the third switching element series circuit, the other end thereof connected to the series connection point of the third and fourth semiconductor switching elements of the second switching element series circuit, and a tapped terminal thereof connected to the other end of the AC power source.

11. The electric power converting device as claimed in claim 5, wherein the second reactor is a tapped reactor having one end thereof connected to the other end of the load and the series connection point of the fifth and sixth semiconductor switching elements of the third switching element series circuit, the other end thereof connected to the series connection point of the third and fourth semiconductor switching elements of the second switching element series circuit, and a tapped terminal thereof connected to the other end of the AC power source.

12. The electric power converting device as claimed in claim 6, wherein the second reactor is a tapped reactor having one end thereof connected to the other end of the load and the series connection point of the fifth and sixth semiconductor switching elements of the third switching element series circuit, the other end thereof connected to the series connection point of the third and fourth semiconductor switching elements of the second switching element series circuit, and a tapped terminal thereof connected to the other end of the AC power source.

13. An electric power converting device as claimed in claim 1, further including
a fourth capacitor connected in series with the first capacitor, the first and fourth capacitors forming a capacitor series circuit;
a changeover switch having a common terminal and first and second switching contacts; and
a voltage distinguishing circuit connected between the changeover switch and the AC power source, the voltage distinguishing circuit distinguishing whether an AC power source voltage is higher or lower than a specified voltage,
wherein the common terminal of the changeover switch is connected to the other end of the AC power source,
wherein the first switching contact of the changeover switch is connected to the series connection point of the third and fourth semiconductor switching elements of the second switching element series circuit,
wherein the second switching contact of the changeover switch is connected to a series connection point of the first and fourth capacitors of the capacitor series circuit,
wherein the changeover switch is switchable to connect the common terminal to the first switching contact when the voltage distinguishing circuit distinguishes that the AC power source voltage is higher than the specified voltage, and the changeover switch is switchable to connect the common terminal to the second switching contact when the voltage distinguishing circuit distinguishes that the AC power source voltage is lower than the specified voltage,
wherein when the changeover switch is switched to connect the common terminal to the first switching contact, the second and third switching element series circuits form the series converter, which compensates a change in voltage of the AC power source to supply a constant voltage to the load, and the first and second switching element series circuits form the parallel converter, which compensates a change in voltage of the first and fourth capacitors due to the compensating operation of the series converter by a charging and discharging operation between the AC power source and the first and fourth capacitors, and wherein when the changeover switch is switched to connect the common terminal to the second switching contact, the third switching element series circuit forms the series converter, which compensates a change in voltage of the AC power source to supply a constant voltage to the load, and the first switching element series circuit forms the parallel converter, which compensates a change in voltage of the first and fourth capacitors due to the compensating operation of the series converter by a charging and discharging operation between the AC power source and the first and fourth capacitors.

14. An electric power converting device as claimed in claim 1, further including:

a fourth capacitor connected in series with the first capacitor, the first and fourth capacitors forming a capacitor series circuit;

a switching unit; and a voltage distinguishing circuit connected between the switching unit and the AC power source, the voltage distinguishing circuit distinguishing whether the AC power source voltage is higher or lower than a specified voltage, wherein the switching unit is connected between a series connection point of the first and fourth capacitors of the capacitor series circuit and the other end of the AC power source, wherein the switching unit is turned-off when the voltage distinguishing circuit distinguishes that the AC power source voltage is higher than the specified voltage, and the switching unit is turned-on when the voltage distinguishing circuit distinguishes that the AC power source voltage is lower than the specified voltage, wherein when the switching unit is turned-off, the second and third switching element series circuits form the series converter, which compensates a change in voltage of the AC power source to supply a constant voltage to the load, and the first and second switching element series circuits form the parallel converter, which compensates a change in voltage of the first and fourth capacitors due to the compensating operation of the series converter by a charging and discharging operation between the AC power source and the first and fourth capacitors, and wherein when the switching unit is turned-on, the third switching element series circuit forms the series converter, which compensates a change in voltage of the AC power source to supply a constant voltage to the load, and the first switching element series circuit forms the parallel converter, which compensates a change in voltage of the first and fourth capacitors due to the compensating operation of the series converter by a charging and discharging operation between the AC power source and the first and fourth capacitors.

* * * * *